(12) United States Patent
Bonilla

(10) Patent No.: US 11,291,934 B2
(45) Date of Patent: Apr. 5, 2022

(54) END CAP ASSEMBLY, FILTER, AND METHOD OF USE

(71) Applicant: Pall Corporation, Port Washington, NY (US)

(72) Inventor: Robb D. Bonilla, Auburn, NY (US)

(73) Assignee: Pall Corporation, Port Washington, NY (US)

( * ) Notice: Subject to any disclaimer, the term of this patent is extended or adjusted under 35 U.S.C. 154(b) by 116 days.

(21) Appl. No.: 16/796,005

(22) Filed: Feb. 20, 2020

(65) Prior Publication Data

US 2021/0260506 A1    Aug. 26, 2021

(51) Int. Cl.
  *B01D 29/96*    (2006.01)
  *B01D 29/13*    (2006.01)

(52) U.S. Cl.
  CPC .............. *B01D 29/96* (2013.01); *B01D 29/13* (2013.01); *B01D 2201/291* (2013.01); *B01D 2201/4084* (2013.01); *B01D 2201/4092* (2013.01)

(58) Field of Classification Search
  CPC .. B01D 29/96; B01D 29/13; B01D 2201/291; B01D 2201/4084; B01D 2201/4092;
  (Continued)

(56) References Cited

U.S. PATENT DOCUMENTS 5,141,637 A    8/1992 Reed et al.
5,394,316 A    2/1995 Holbrook et al.
(Continued)

FOREIGN PATENT DOCUMENTS

EP    2 789 375 A1    10/2014
JP    H7-100309 A    4/1995
(Continued)

OTHER PUBLICATIONS

Extended European Search Report issued in Counterpart European Application 21157773.9, dated Jun. 17, 2021.
(Continued)

*Primary Examiner* — Madeline Gonzalez
(74) *Attorney, Agent, or Firm* — Leydig Voit & Mayer, Ltd.

(57) ABSTRACT

An end cap assembly comprises a first connector element comprising at least two snap arches, each snap arch including a snap tooth lock; and at least two snap arms each including a snap tooth; the first connector element having a central cavity closed off with a wall, or having a central opening with side walls having an internal thread; a second connector element comprising at least two snap arches, each connector snap arches including a snap tooth lock; and at least two snap arms, each of the at least two snap arms including a snap tooth; the second connector element having a central opening, and an annular channel for receiving an end of a hollow cylindrical filter element; and, a gasket arranged between the first connector element and the second connector element, the gasket having a central opening; wherein the connector elements are lockably engageable with each other when placed in contact with each other and axial force is applied such that each first connector snap tooth is retained in each respective second connector snap tooth lock, and each second connector snap tooth is retained in each respective first connector snap tooth lock.

8 Claims, 13 Drawing Sheets

(58) Field of Classification Search
CPC ............ B01D 46/2414; B01D 46/0004; B01D 2265/027; B01D 35/30; B01D 2201/29; B01D 2201/30; B01D 2201/40; B01D 29/50; B01D 29/52; B01D 27/14; B01D 27/144; B01D 29/0054; B01D 35/14
USPC ....... 210/236, 232, 253, 261, 262, 314, 316, 210/322, 330, 338, 339, 446, 488, 493.2, 210/450
See application file for complete search history.

(56) References Cited

U.S. PATENT DOCUMENTS

| | | |
|---|---|---|
| 6,632,356 B2 | 10/2003 | Hallan et al. |
| 7,063,730 B2 | 6/2006 | Connor et al. |
| 7,237,682 B2 | 7/2007 | Reynolds et al. |
| 7,934,617 B2 | 5/2011 | Minowa et al. |
| 9,447,758 B2 | 9/2016 | Girondi |
| 2006/0186031 A1 | 8/2006 | Fick et al. |
| 2007/0034631 A1* | 2/2007 | Minowa ................ B01D 29/21 220/298 |
| 2011/0042294 A1 | 2/2011 | Bonta et al. |
| 2017/0128864 A1 | 5/2017 | Pribanic et al. |
| 2020/0179840 A1 | 6/2020 | Vichev et al. |
| 2021/0260511 A1 | 8/2021 | Bonilla |

FOREIGN PATENT DOCUMENTS

| | | |
|---|---|---|
| JP | H9-222714 A | 8/1997 |
| JP | 2004-536703 A | 12/2004 |
| JP | 2005-125325 A | 5/2005 |
| JP | 2007-46522 A | 2/2007 |
| JP | 2013-522539 A | 6/2013 |
| JP | 2017-166459 A | 9/2017 |

OTHER PUBLICATIONS

Singapore Intellectual Property Office, Search Report in counterpart Singapore Patent Application No. 10202101610Y, dated Jan. 18, 2022.

Japan Patent Office, Office Action in Japanese Counterpart Application No. 2021-023463, dated Jan. 25, 2022.

* cited by examiner

END CAP ASSEMBLY, FILTER, AND METHOD OF USE

BACKGROUND OF THE INVENTION

Filters and filter elements can be provided with end caps. However, attaching the end caps can be labor intensive and/or costly.

The present invention provides for ameliorating at least some of the disadvantages of the prior art. These and other advantages of the present invention will be apparent from the description as set forth below.

BRIEF SUMMARY OF THE INVENTION

An embodiment of the invention provides an end cap assembly comprising (a) a first connector element comprising at least two first connector snap arches, each of the at least two first connector snap arches including a snap tooth lock; and at least two first connector snap arms, each of the at least two first connector snap arms including a snap tooth; the first connector element having a central cavity closed off with a wall; (b) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel for receiving an end of a hollow cylindrical filter element; and, (c) a gasket arranged between the first connector element and the second connector element, the gasket having a central opening; wherein the first connector element and the second connector element are lockably engageable with each other when placed in contact with each other and axial force is applied such that each first connector snap tooth is retained in each respective second connector snap tooth lock, and each second connector snap tooth is retained in each respective first connector snap tooth lock.

An end cap assembly according to another embodiment of the invention comprises (a) a first connector element comprising at least two first connector snap arches, each of the at least two first connector snap arches including a snap tooth lock; and at least two first connector snap arms, each of the at least two first connector snap arms including a snap tooth; the first connector element having a central opening with side walls having an internal thread; (b) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel for receiving an end of a hollow cylindrical filter element; and, (c) a gasket arranged between the first connector element and the second connector element, the gasket having a central opening; wherein the first connector element and the second connector element are lockably engageable with each other when placed in contact with each other and axial force is applied such that each first connector snap tooth is retained in each respective second connector snap tooth lock, and each second connector snap tooth is retained in each respective first connector snap tooth lock.

In another embodiment, a filter comprises (a) a first connector element comprising at least two first connector snap arches, each of the at least two first connector snap arches including a snap tooth lock; and at least two first connector snap arms, each of the at least two first connector snap arms including a snap tooth; the first connector element having a central cavity closed off with a wall; (b) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel receiving an end of a hollow cylindrical filter element; (c) the hollow cylindrical filter element, having a first end and a second end; and, (d) a gasket arranged between the first connector element and the second connector element, the gasket having a central opening; wherein the first connector element and the second connector element are lockably engageable with each other when placed in contact with each other and axial force is applied such that each first connector snap tooth is retained in each respective second connector snap tooth lock, and each second connector snap tooth is retained in each respective first connector snap tooth lock.

In another embodiment, a filter comprises (a) a first connector element comprising at least two first connector snap arches, each of the at least two first connector snap arches including a snap tooth lock; and at least two first connector snap arms, each of the at least two first connector snap arms including a snap tooth; the first connector element having a central opening with side walls having an internal thread; (b) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel receiving an end of a hollow cylindrical filter element; (c) the hollow cylindrical filter element, having a first end and a second end; and, (d) a gasket arranged between the first connector element and the second connector element, the gasket having a central opening; wherein the first connector element and the second connector element are lockably engageable with each other when placed in contact with each other and axial force is applied such that each first connector snap tooth is retained in each respective second connector snap tooth lock, and each second connector snap tooth is retained in each respective first connector snap tooth lock.

A method of attaching an end cap to a filter element according to another embodiment of the invention comprises axially aligning (a) a first connector element comprising at least two first connector snap arches, each of the at least two first connector snap arches including a snap tooth lock; and at least two first connector snap arms, each of the at least two first connector snap arms including a snap tooth; the first connector element having a central cavity closed off with a wall; with (b) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel receiving an end of a hollow cylindrical filter element having a first end and a second end; wherein (c) a gasket is arranged between the first connector element and the second connector element, the gasket having a central opening; and, applying an axial force to the first connector element or the filter element such that each first connector snap tooth is retained in each respective second connector snap tooth lock, and each second connector snap tooth is retained in each respective first connector snap lock.

A method of attaching an end cap to a filter element according to another embodiment of the invention comprises axially aligning (a) a first connector element comprising at least two first connector snap arches, each of the at least two first connector snap arches including a snap tooth lock; and at least two first connector snap arms, each of the at least two first connector snap arms including a snap tooth; the first connector element having a central opening with side walls having an internal thread; with (b) a second connector element comprising at least two second connector snap arches, each of the at least two second connector snap arches including a snap tooth lock; and at least two second connector snap arms, each of the at least two second connector snap arms including a snap tooth; the second connector element having a central opening, and an annular channel receiving an end of a hollow cylindrical filter element having a first end and a second end; wherein (c) a gasket is arranged between the first connector element and the second connector element, the gasket having a central opening; and, applying an axial force to the first connector element or the filter element such that each first connector snap tooth is retained in each respective second connector snap tooth lock, and each second connector snap tooth is retained in each respective first connector snap lock.

BRIEF DESCRIPTION OF THE SEVERAL VIEWS OF THE DRAWING(S)

FIG. 1A shows a top perspective view of a first connector element of an open end cap assembly according to an embodiment of the invention, the first connector element having a central opening with side walls having an internal thread; FIG. 1B shows a bottom perspective view of the first connector element shown in FIG. 1A; FIG. 1C shows a perspective view of the first connector element shown in FIG. 1A joined to a second connector element, also showing a cylindrical filter element, wherein one end of the cylindrical filter element is bound in an annular channel in the second connector element, and a conventional end cap is bound to the other end of the cylindrical filter element.

FIG. 2A shows a top perspective view of a first connector element of a closed end cap assembly according to another embodiment of the invention, the first connector element having a central cavity closed off with a wall; FIG. 2B shows a bottom perspective view of the first connector element cap shown in FIG. 2A; FIG. 2C shows a perspective view of the first connector element shown in FIG. 2A joined to a second connector element, also showing a cylindrical filter element, wherein one end of the cylindrical filter element is bound in an annular channel in the second connector element, and a conventional end cap is bound to the other end of the cylindrical filter element.

FIG. 3 shows partial views of unassembled end cap assemblies comprising first connector elements as shown in FIGS. 1A and 1B, and a second connector element, before the first and second connector elements are joined together, also showing the second connector element including two walls each having a hyperbolic paraboloid shape. FIG. 3 also shows a hollow cylindrical filter element bound to the second connector element, and a second connector has a central opening for fluid flow.

FIG. 4A shows a view similar to that shown in FIG. 3, showing the connector elements including walls having hyperbolic paraboloid shapes without showing the snap arches and snap arms shown in FIG. 3. FIG. 4B shows the connector elements aligned before they will be connected by axial force. FIG. 4C shows alignment between the walls of each connector element having hyperbolic paraboloid shapes, such that the uppermost part of one wall of one connector element aligns with the lowermost part of the corresponding wall of the other connector element.

FIG. 5 shows a fragmented exploded perspective view similar to that shown in FIGS. 3 and 4A, wherein the walls having hyperbolic paraboloid shapes are included, also including a snap tooth lock, a snap arch including a snap tooth, and a snap arm in phantom. The arrow shows the direction that applied axial force will connect the connector elements. The downwardly facing arrow shows the direction that applied axial force will connect the connector elements.

DETAILED DESCRIPTION OF THE INVENTION

Figure 1B:
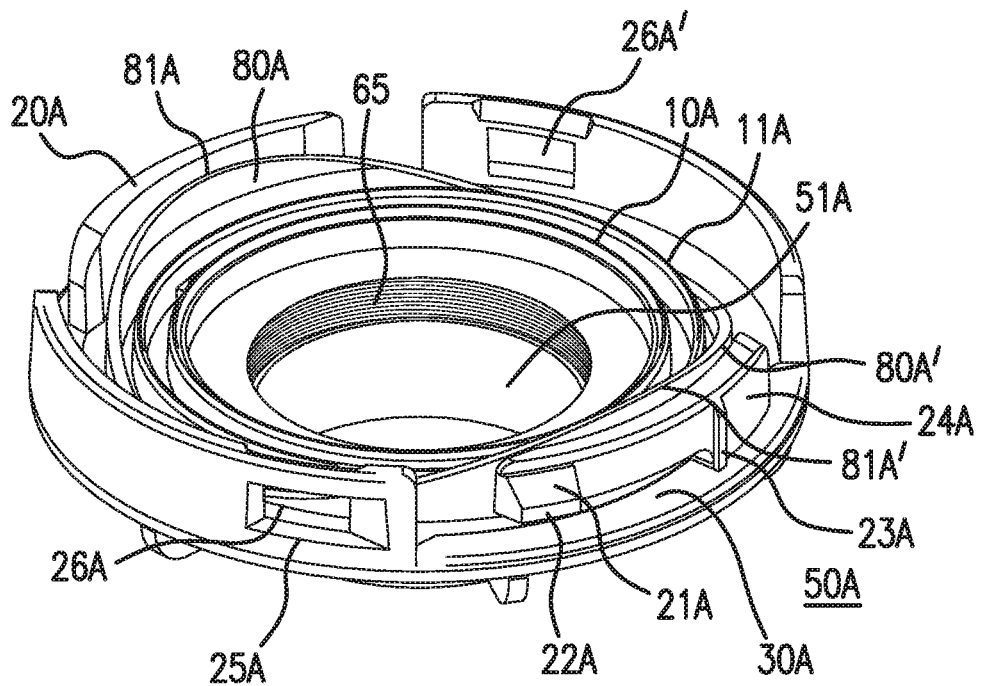

An embodiment of the invention provides an end cap assembly comprising (a) a first connector element comprising at least two first connector element snap arches, each of the at least two first connector element snap arches including a snap tooth lock; and at least two first connector element snap arms, each of the at least two first connector element snap arms including a snap tooth; the first connector element having a central cavity closed off with a wall; (b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening, and an annular channel for receiving an end of a hollow cylindrical filter element; and, (c) a gasket arranged between the first connector element and the second connector element, the gasket having a central opening; wherein the first connector element and the second connector element are lockably engageable with each other when placed in contact with each other and axial force is applied such that each first connector element snap tooth is retained in each respective second connector element snap tooth lock, and each second connector element snap tooth is retained in each respective first connector element snap tooth lock.

An end cap assembly according to another embodiment of the invention comprises (a) a first connector element comprising at least two first connector element snap arches, each of the at least two first connector element snap arches including a snap tooth lock; and at least two first connector element snap arms, each of the at least two first connector element snap arms including a snap tooth; the first connector element having a central opening with side walls having an internal thread; (b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening, and an annular channel for receiving an end of a hollow cylindrical filter element; and, (c) a gasket arranged between the first connector element and the second connector element, the gasket having a central opening; wherein the first connector element and the second connector element are lockably engageable with each other when placed in contact with each other and axial force is applied such that each first connector element snap tooth is retained in each respective second connector element snap tooth lock, and each second connector element snap tooth is retained in each respective first connector element snap tooth lock.

In a typical embodiment, each connector element snap tooth includes a snap ramp.

In a preferred embodiment, each of the first and second connector elements includes two walls, each wall having a hyperbolic paraboloid shape.

In another embodiment, a filter comprises (a) a first connector element comprising at least two first connector element snap arches, each of the at least two first connector element snap arches including a snap tooth lock; and at least two first connector element snap arms, each of the at least two first connector element snap arms including a snap tooth; the first connector element having a central cavity closed off with a wall; (b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening, and an annular channel receiving an end of a hollow cylindrical filter element; (c) the hollow cylindrical filter element, having a first end and a second end; and, (d) a gasket arranged between the first connector element and the second connector element, the gasket having a central opening; wherein the first connector element and the second connector element are lockably engageable with each other when placed in contact with each other and axial force is applied such that each first connector element snap tooth is retained in each respective second connector element snap tooth lock, and each second connector element snap tooth is retained in each respective first connector element snap tooth lock.

In another embodiment, a filter comprises (a) a first connector element comprising at least two first connector element snap arches, each of the at least two first connector element snap arches including a snap tooth lock; and at least two first connector element snap arms, each of the at least two first connector element snap arms including a snap tooth; the first connector element having a central opening with side walls having an internal thread; (b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening, and an annular channel receiving an end of a hollow cylindrical filter element; (c) the hollow cylindrical filter element, having a first end and a second end; and, (d) a gasket arranged between the first connector element and the second connector element, the gasket having a central opening; wherein the first connector element and the second connector element are lockably engageable with each other when placed in contact with each other and axial force is applied such that each first connector element snap tooth is retained in each respective second connector element snap tooth lock, and each second connector element snap tooth is retained in each respective first connector element snap tooth lock.

In some embodiments of the filter, one of the first or second ends of the hollow cylindrical filter element is received in the annular channel of the second connector element, and the other of the first or second ends of the hollow cylindrical filter element is received in an annular channel of an additional second connector element which is lockably engageable with an additional first connector element, or, one of the first or second ends of the hollow cylindrical filter element is received in the annular channel of the second connector element, and the other of the first or second ends of the hollow cylindrical filter element is connected to a conventional end cap.

A method of attaching an end cap to a filter element according to another embodiment of the invention comprises axially aligning (a) a first connector element comprising at least two first connector element snap arches, each of the at least two first connector element snap arches including a snap tooth lock; and at least two first connector element snap arms, each of the at least two first connector element snap arms including a snap tooth; the first connector element having a central cavity closed off with a wall; with (b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening, and an annular channel receiving an end of a hollow cylindrical filter element having a first end and a second end; wherein (c) a gasket is arranged between the first connector element and the second connector element, the gasket having a central opening; and, applying an axial force to the first connector element or the filter element such that each first connector element snap tooth is retained in each respective second connector element snap tooth lock, and each second connector element snap tooth is retained in each respective first connector element snap lock.

A method of attaching an end cap to a filter element according to another embodiment of the invention comprises axially aligning (a) a first connector element comprising at least two first connector element snap arches, each of the at least two first connector element snap arches including a snap tooth lock; and at least two first connector s element nap arms, each of the at least two first connector element snap arms including a snap tooth; the first connector element having a central opening with side walls having an internal thread; with (b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening, and an annular channel receiving an end of a hollow cylindrical filter element having a first end and a second end; wherein (c) a gasket is arranged between the first connector element and the second connector element, the gasket having a central opening; and, applying an axial force to the first connector element or the filter element such that each first connector element snap tooth is retained in each respective second connector element snap tooth lock, and each second connector element snap tooth is retained in each respective first connector element snap lock.

A filter device according to an embodiment of the invention comprises an embodiment of at least one filter arranged in a housing having an inlet and an outlet and defining a fluid flow path between the inlet and the outlet with the filter arranged across the fluid flow path.

A method of filtration according to an embodiment of the invention comprises passing a fluid along the fluid flow path through embodiment of the filter device.

A variety of fluids can be processed using embodiment of the filter. In one embodiment, the filter device comprises a coalescer, coalescing water and/or oil (and in some embodiments, removing particulate matter) from the stream of fluid being processed.

Advantageously, separate filters having various filter element lengths can be produced in advance and shipped, providing a cost-effective option for obtaining different filters for different applications. Alternatively, or additionally, different filter element end caps can be bound to filter elements to provide more options for the resultant final filter and filter device.

Each of the components of the invention will now be described in more detail below, wherein like components have like reference numbers. In accordance with the illustrated embodiments the first and second connector elements have some of the same corresponding elements, and thus, those components have the same names.

As will be discussed in more detail below, the illustrated embodiments of the first connector elements 50A and 50A1, and the second connector elements 50B each have the following like components (reference numbers will be provided with the figure descriptions below):

Two cylindrical walls projecting upwardly from the base, each wall having a hyperbolic paraboloid shape with an uppermost part, wherein the cylindrical walls have uniform acclivity. Each connector element includes, projecting upwardly from the base, a concentrically arranged crown including a snap tooth lock, extending in a circumferential direction forming a snap arch wherein the connector elements each also include a snap arm including a snap tooth preferably having a snap ramp, and a centering rib and a snap root. The presence of centering ribs, that are present between the outside of a snap arm and the inside of a crown, can be desirable in reducing or preventing radial sliding, e.g., coaxial dislocation of the two connector elements once connected or assembled. Preferably, each first connector element and each second connector element has at least two crowns each including a snap arches, and at least two snap arms.

After the first and second elements are brought together, positioned coaxially with the respect snap teeth aligned with the snap teeth locks, and with a gasket placed coaxially between the elements, axial force is applied and the respective snap arches are engaged and the snap arms are slightly flexed inwardly and the snap arches are slightly deflected outwardly, and the snap teeth pass over the snap arches into the snap teeth locks. The snap ramps pass over the snap arches and secure the snap teeth into the snap teeth locks, and spring back to their original configuration such that the snap arches retain the trailing edges of the snap teeth and prevent reverse axial action out of the snap teeth locks.

Figure 1A:
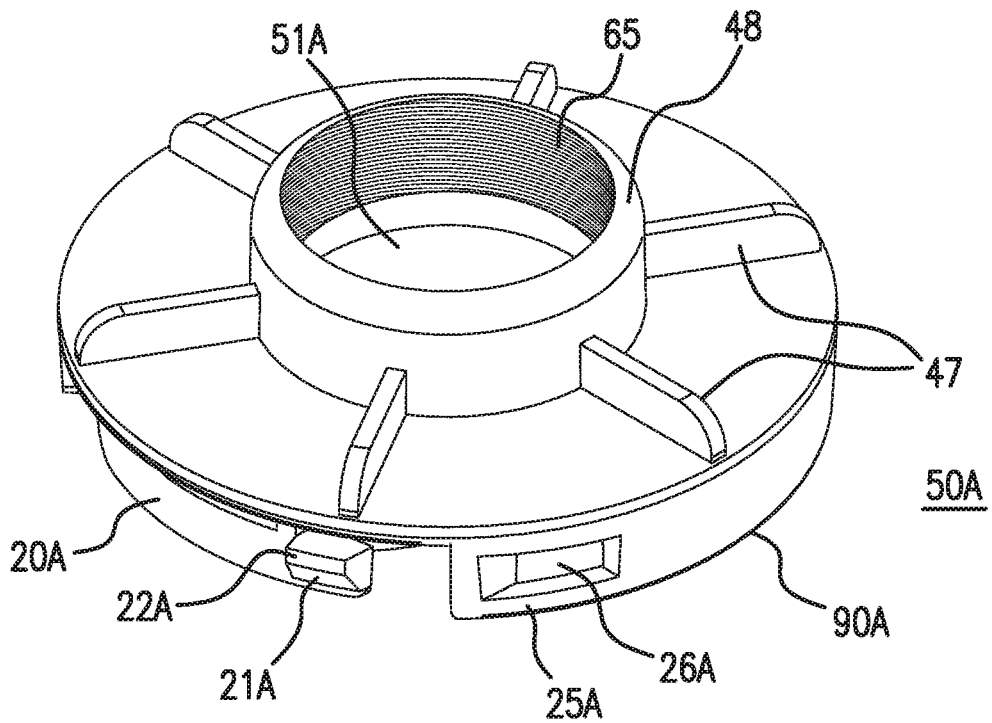

FIGS. 1A and 1B show, respectively, top and bottom perspective views of a first connector element 50A of an open end cap assembly according to an embodiment of the invention, the first connector element having a central opening 51A with side walls having an internal thread 65. The presence of the central opening with an internal thread allows the connection to a threaded adapter and/or threaded filter housing. FIG. 1B also shows an optional collar 48 and optional collar support ribs 47.

Figure 2B:
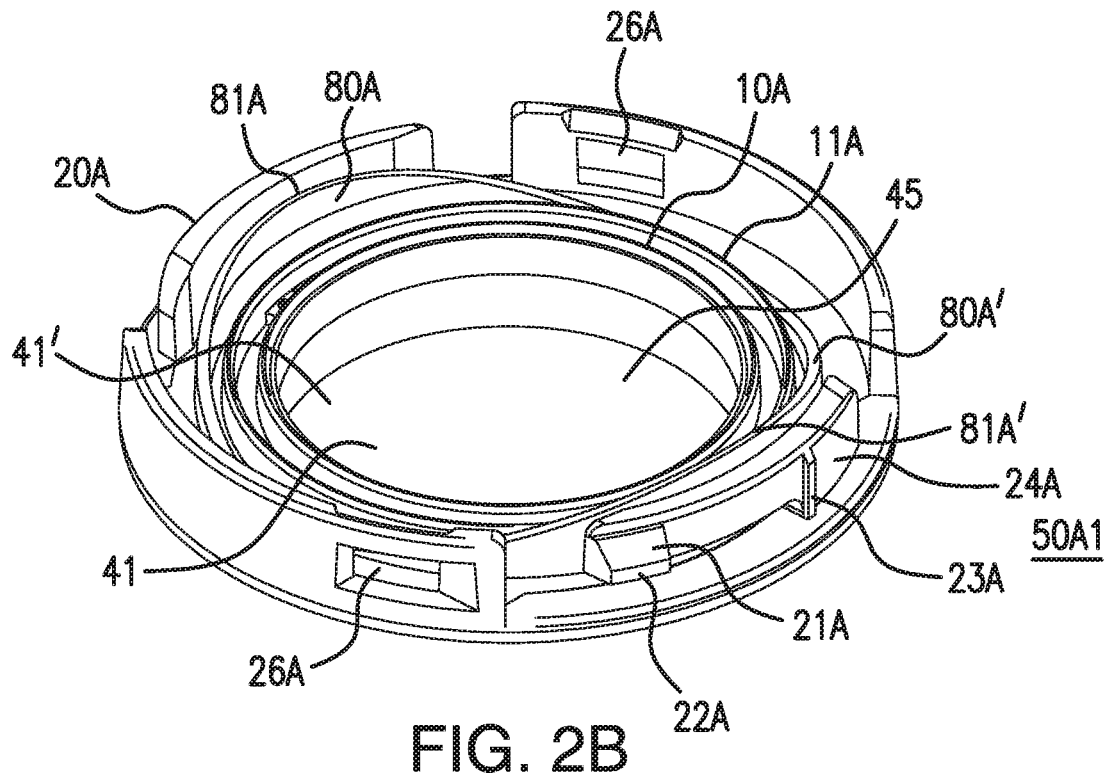
Figure 2A:
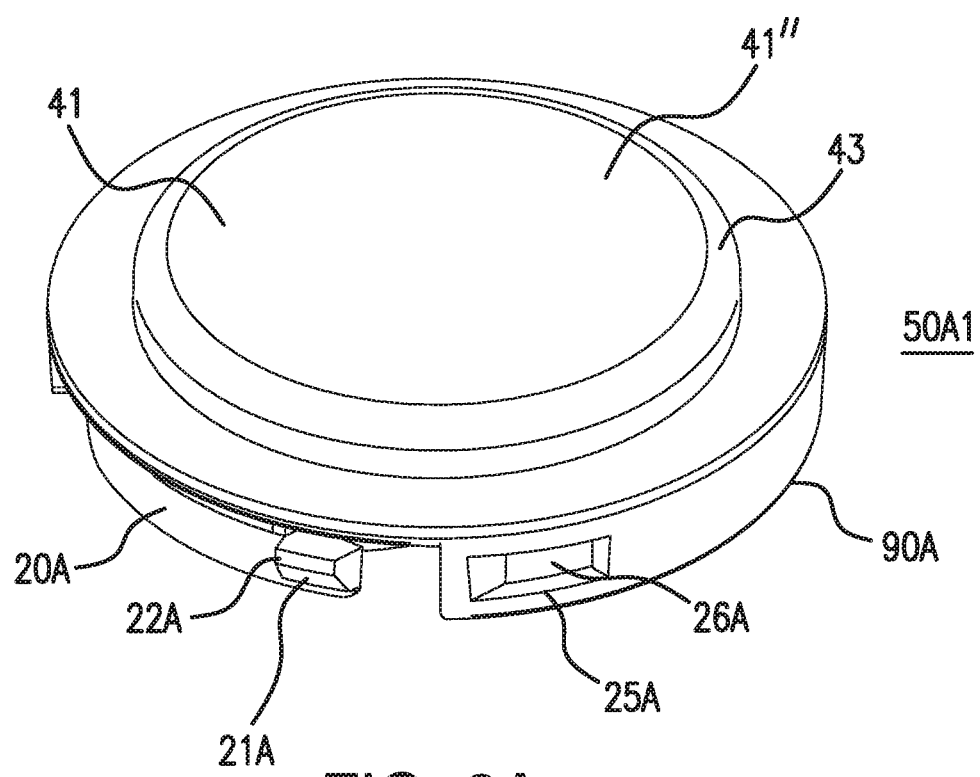

FIGS. 2A and 2B shows, respectively, top and bottom perspective views of a first connector element 50A1 of a closed end cap assembly according to another embodiment of the invention, the first connector element having a central cavity 45 closed off with a wall 41 having an inner surface 41' and an outer surface 41". While the outer surface 41" can have a variety of configuration, e.g., planar or substantially planar, FIG. 2A shows an optional raised portion 43.

Figure 1C:
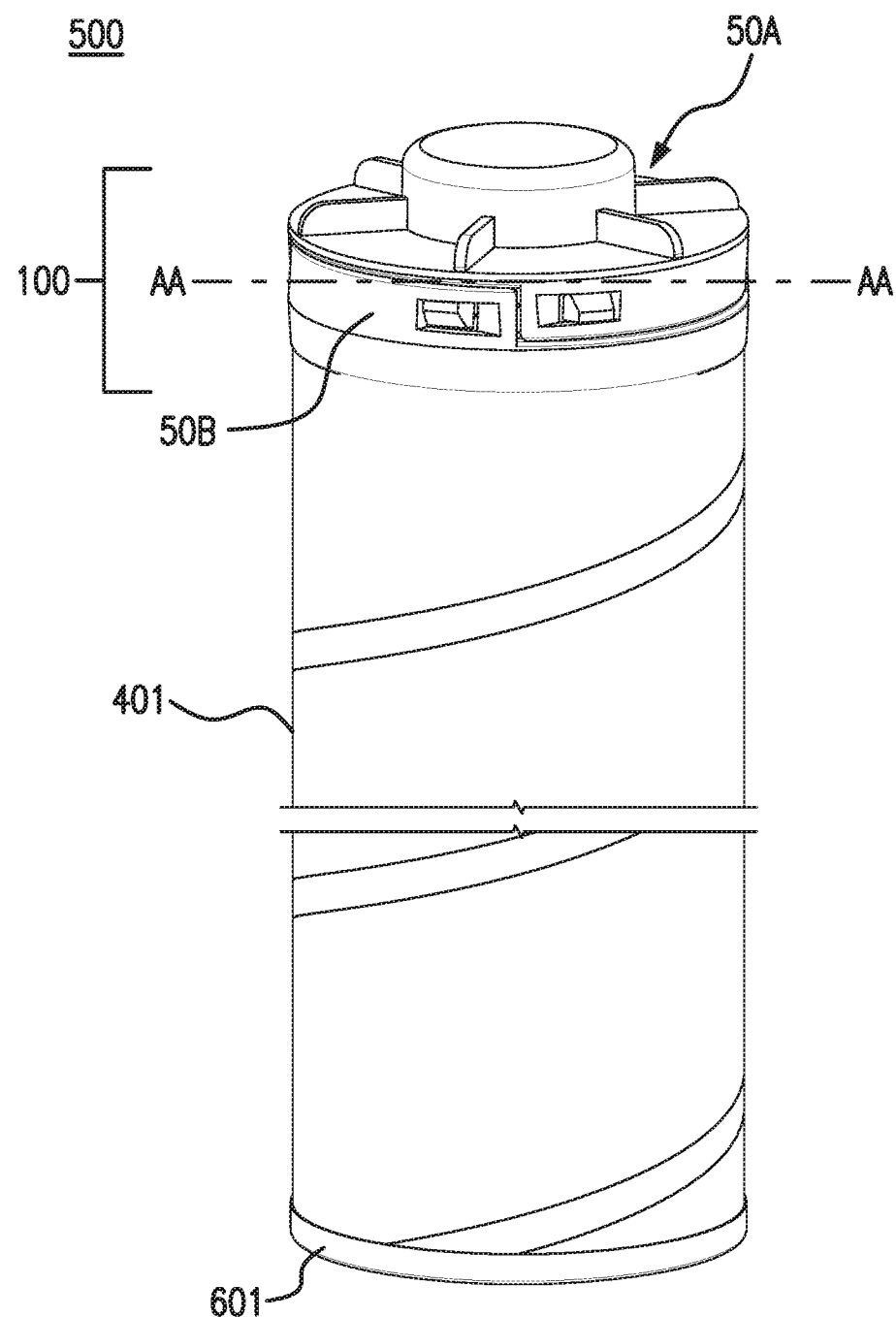
Figure 2C:
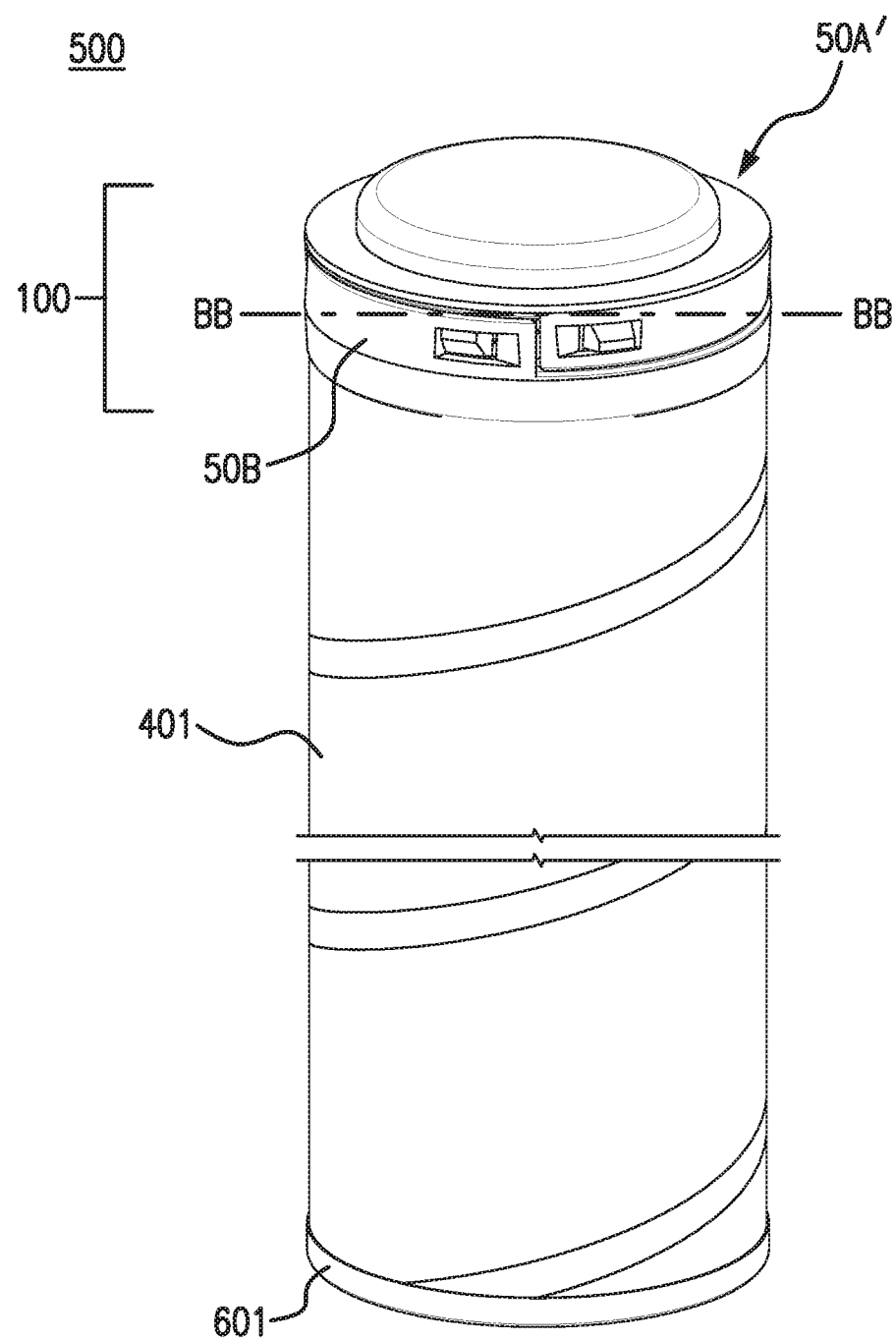

FIGS. 1C and 2C show perspective views of filters 500 comprising the first connector elements 50A (FIG. 1C) and 50A1 (FIG. 2C) connected to the second connector element 50B, forming an assembled embodiment of a connector assembly 100, wherein a filter element 401 having a first and a second end has one filter end bonded to an embodiment of the second connector element 50B, and the other filter end bonded to an end cap 601. While FIGS. 1C and 2C show an end cap 601 illustrated as a conventional end cap (that can be open or closed; typically, if connector element 50A1 is at one end of the filter, the conventional end cap 601 at the other end of the filter element is open) bonded to the other filter end, in other embodiments, embodiments of the connector assemblies are provided at both ends of the filter element. For example, an embodiment of connector assembly 100 as shown in FIG. 1C can be at both ends of the filter element, or an embodiment of connector assembly 100 as shown in FIG. 1C can be at one end of the filter element, and an embodiment of connector assembly 100 as shown in FIG. 2C can be at the other end of the filter element.

Figure 6:
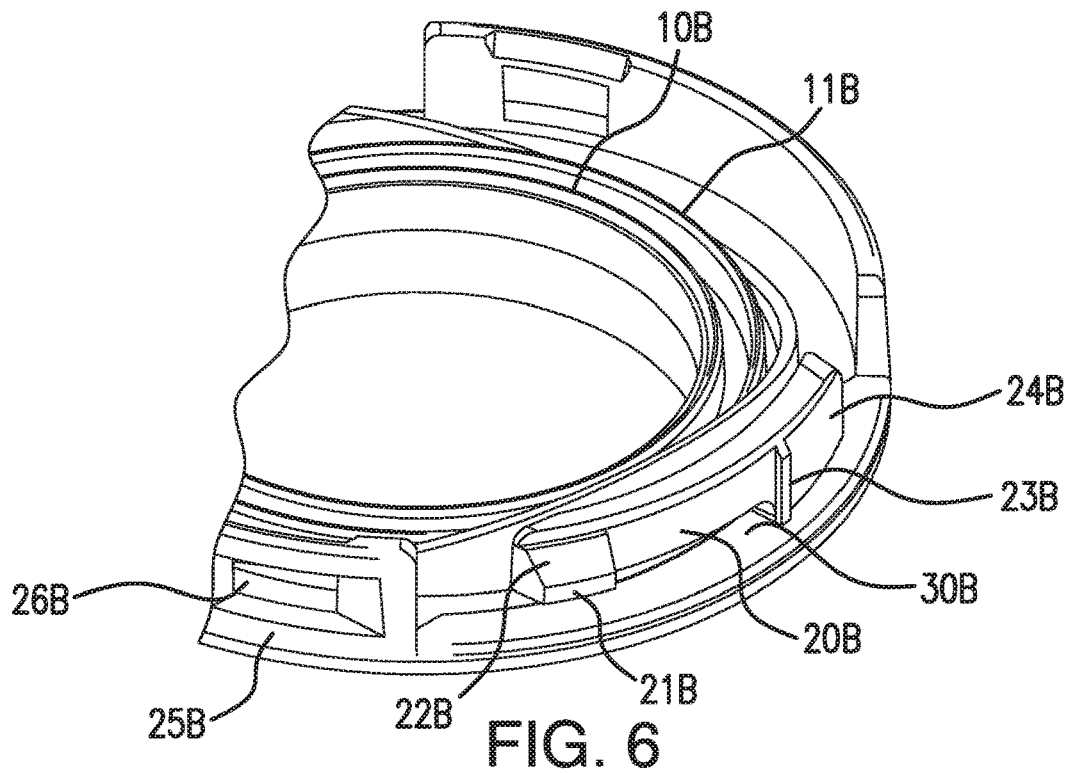
FIG. 6 is a partial exploded perspective view of a part of a connector element, showing a snap arm including a snap tooth having a snap ramp and a snap nose, and a centering rib. The illustrated structures are present in both the first connector element and the second connector element.
Figure 7:
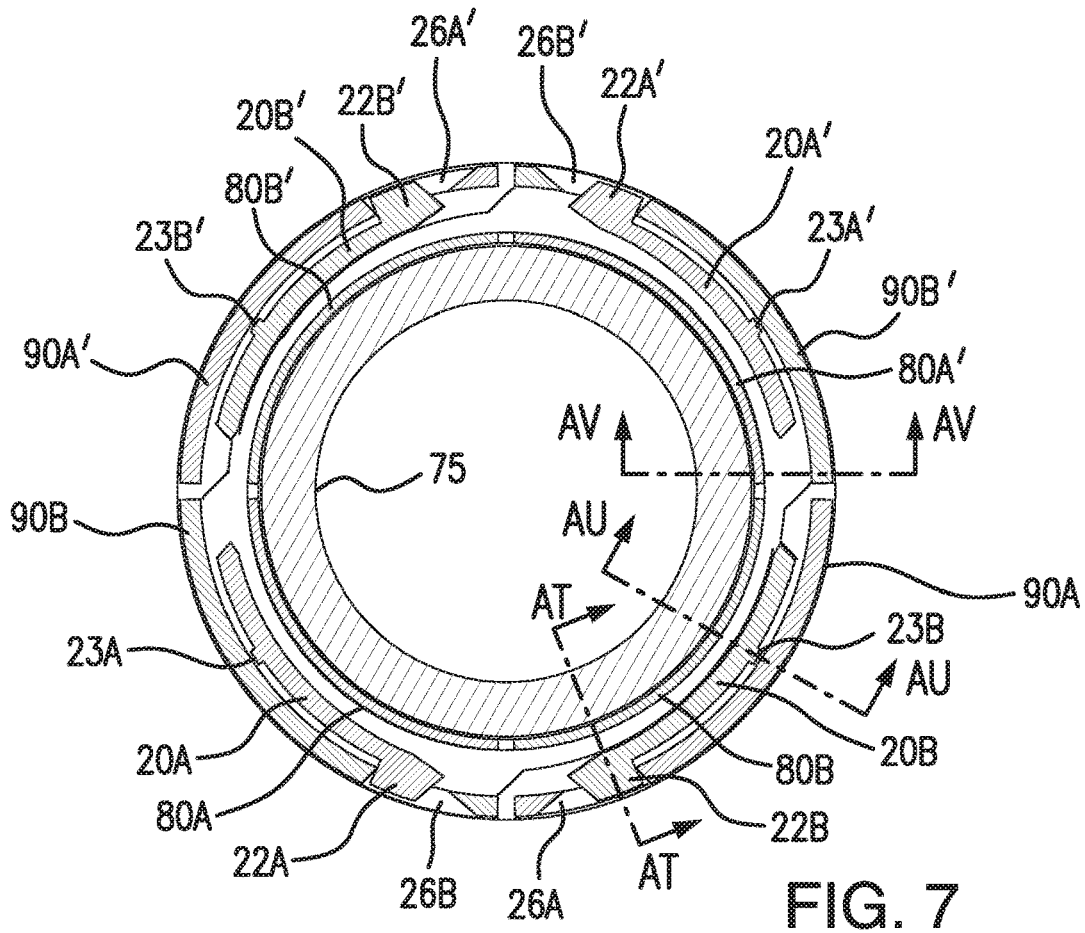
FIG. 7 is a cross-sectional plan view of the assembled end cap assemblies shown in FIGS. 1C and 2C, taken along line AA-AA of FIG. 1C and line BB-BB of FIG. 2C.

Each first connector element 50A (FIGS. 1A and 1B), and 50A1 (FIGS. 2A and 2B) includes, projecting upwardly from the base 30A, a concentrically arranged crown 90A, including a snap tooth lock 26A, extending in a circumferential direction forming a snap arch 25A wherein the connector elements each also include a snap arm 20A, including a snap tooth 22A, illustrated as having a snap ramp 21A. In these illustrated embodiments (see also, FIG. 6 showing like components in the second connector element 50B) first connector element 50A, 50A1 includes a centering rib 23A and a snap root 24A. The presence of centering ribs, that are present between the outside of a snap arm and the inside of a crown, can be desirable in reducing or preventing radial sliding. Preferably, each first connector element and each second connector element has at least two crowns each including a snap arches, and at least two snap arms as described with respect to FIG. 3 (see, for example, FIG. 7). In the embodiment illustrated in FIG. 7, each first and second connector element has crowns and snap teeth locks; snap arms and snap teeth/snap ramps; centering ribs and snap roots, equally spaced from one another in a circumferential direction.

The first connector elements 50A and 50A1 each include, projecting upwardly from the base 30A, two cylindrical walls 80A, 80A', each having a hyperbolic paraboloid shape with an uppermost part 81A, 81A', wherein the cylindrical walls have uniform acclivity.

Figure 3:
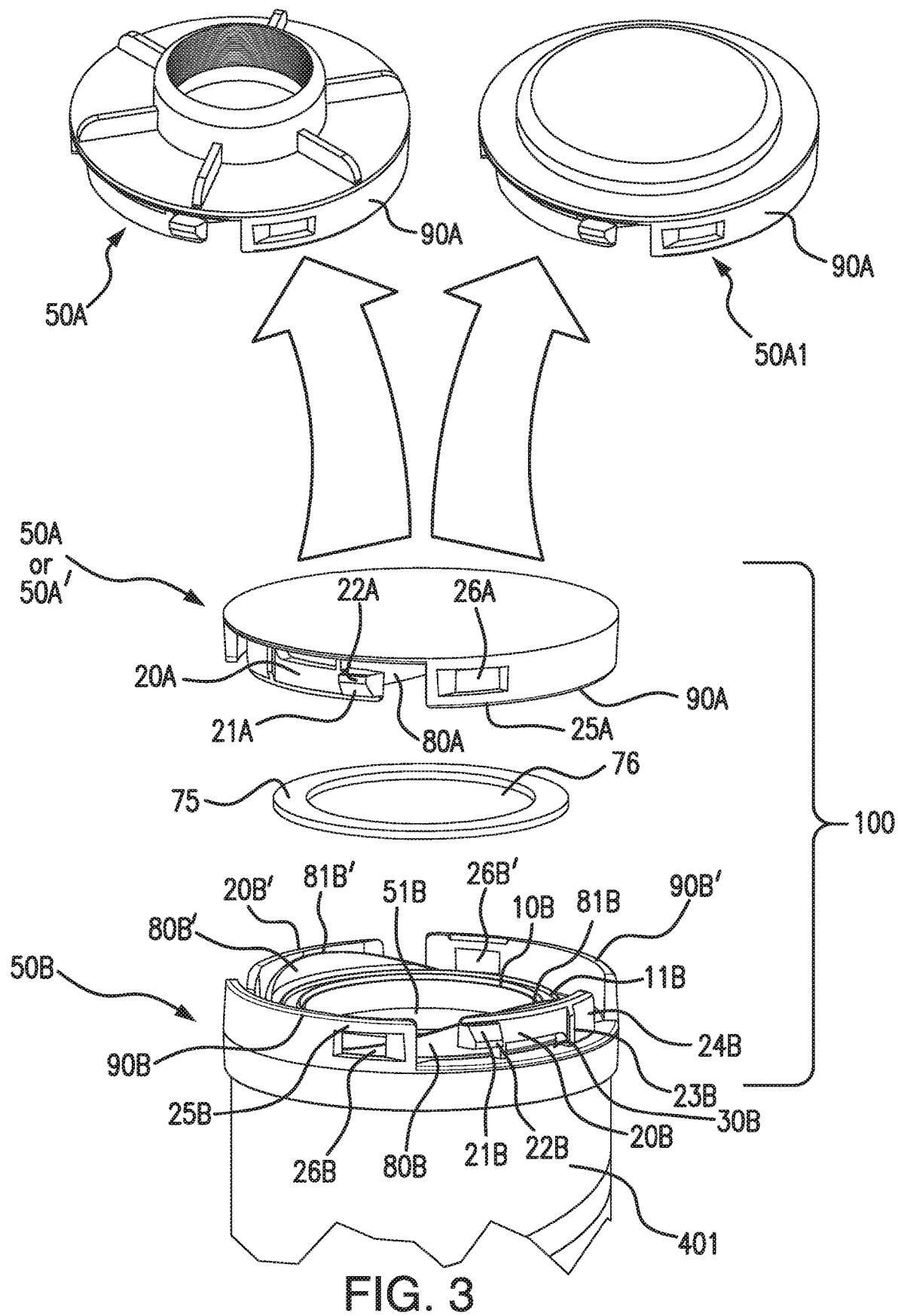

FIG. 3 shows an unassembled end cap assembly 100 according to an embodiment of the invention, comprising first connector element 50A, 50A1, and second connector element 50B, also showing an annular gasket 75 having a central opening 76, arranged between the first and second connector elements, wherein one end of a hollow cylindrical filter element 401 is bound to the second connector element. The second connector element 50B includes a central opening 51B for fluid flow.

Figure 4A:
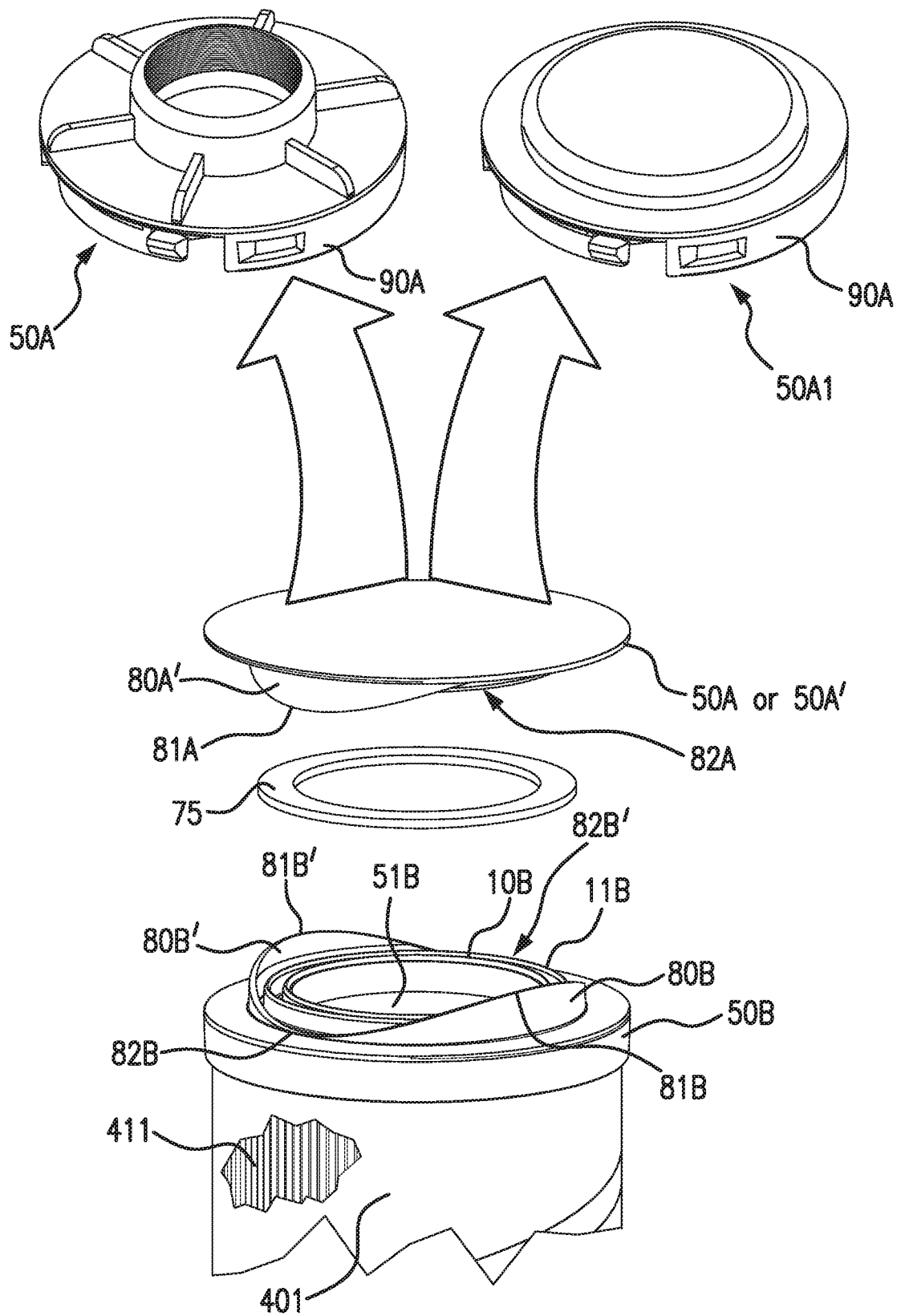
Figure 4B:
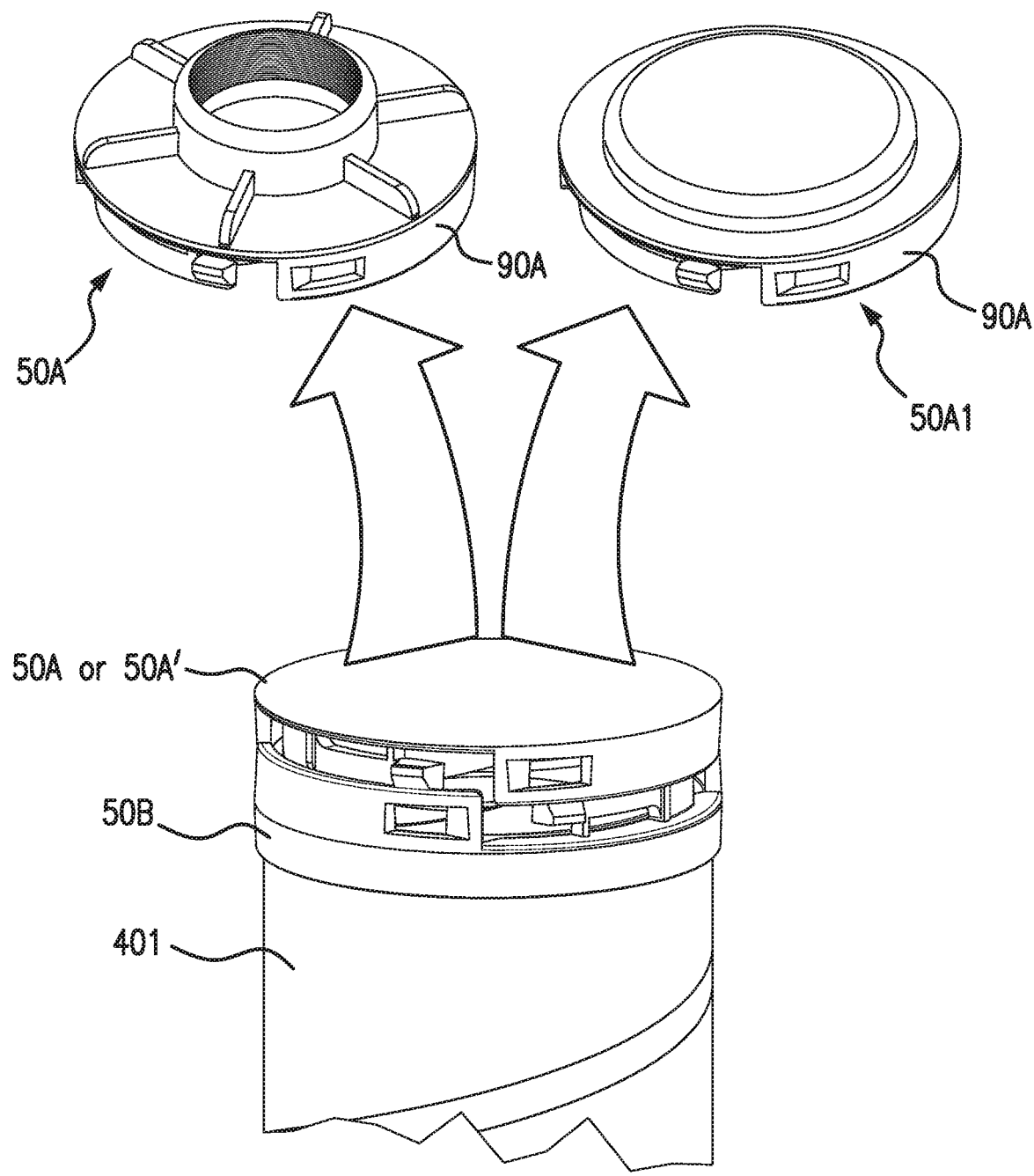
Figure 4C:
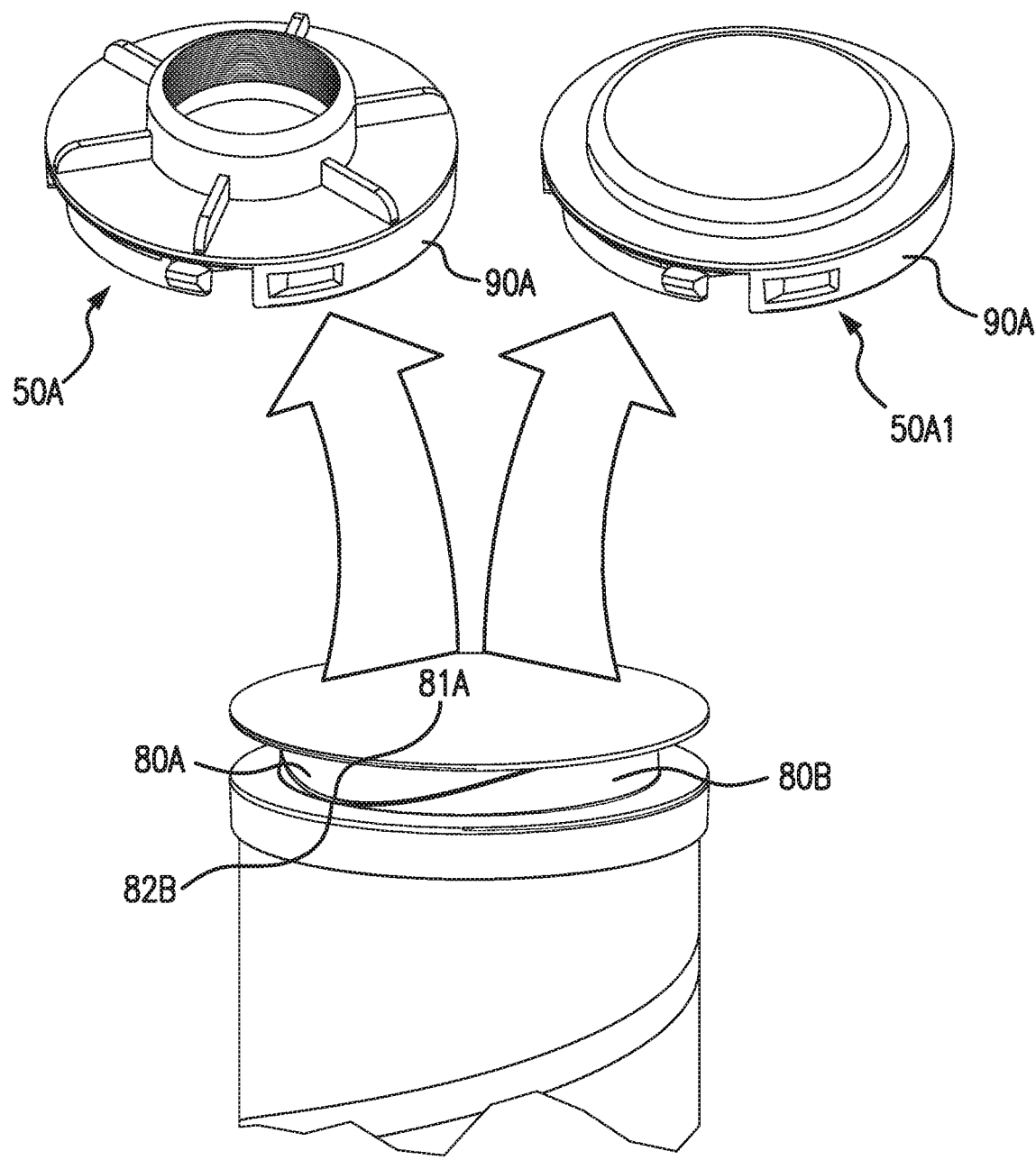

FIG. 3 also shows that the second connector element 50B has, projecting upwardly from the base 30B, two cylindrical walls 80B, 80B', each having a hyperbolic paraboloid shape, with uniform acclivity, and as shown in FIG. 4C, the uppermost parts 81A, 81A', 81B, 81B' of the walls of one connector element align with the lowermost parts of the walls of the other connector (see, for example, lowermost parts 82B and 82B' of the second connector 50B as shown in FIG. 4A) when the connector elements are joined.

FIG. 3 also shows, for second connector element 50B (similar to elements shown for first connector elements 50A and 50A1 described in FIGS. 1A, 1B, 2A, and 2B), second connector element 50B including, projecting upwardly from the base 30B, a respective concentrically arranged crown 90B, including a snap tooth lock 26B, extending in a circumferential direction forming a snap arch 25B, wherein the connector element also includes a snap arm 20B, including a snap tooth 22B, having a snap ramp 21B. In this illustrated embodiment (also shown in FIG. 6), second connector element 50B includes a centering rib 23B and a snap root 24B. Preferably, each first and second connector element has at least two crowns each including a snap arches, and at least two snap arms as described with respect to FIG. 3 (see, for example, FIG. 7). In the embodiment illustrated in FIG. 5, each connector element has crowns and snap teeth locks; snap arms and snap teeth/snap ramps; centering ribs and snap roots, equally spaced from one another in a circumferential direction.

As discussed above, when the first and second elements are brought together, positioned coaxially with the respect snap teeth aligned with the snap teeth locks, and with the gasket placed coaxially between the elements, axial force is applied and the respective snap arches are engaged and the snap arms are slightly flexed inwardly and the snap arches are slightly deflected outwardly, and the snap teeth pass over the snap arches into the snap teeth locks. This action occurs simultaneously circumferentially with all of the snap arches and snap arms. The outermost diameter of all of the snap teeth should be congruent with the outermost surface of the snap teeth locks to maintain a fluid-tight seal.

The snap ramps pass over the snap arches and secure the snap teeth into the snap teeth locks, and spring back to their original configuration such that the snap arches retain the trailing edges of the snap teeth and prevent reverse axial action out of the snap teeth locks. As a result, the snap connector elements cannot be disengaged without damaging the elements, unless a special tool is used.

FIGS. 1B and 2B show, projecting upwardly from the base 30A, concentrically arranged circular inner sealing wall 10A and outer sealing wall 11A of first connector elements 50A and 50A1, and FIGS. 3, and 4A show, projecting upwardly from the base 30B, concentrically arranged circular inner sealing wall 10B and outer sealing wall 11B of second connector element 50B. As shown in more detail in, for example, FIGS. 8-10, the angular peaks or tips of the sealing walls 10A, 10B, 11A, 11B compress the upper and lower planar surfaces of the gasket 75 when the connector elements are joined, providing a seal.

Figure 8:
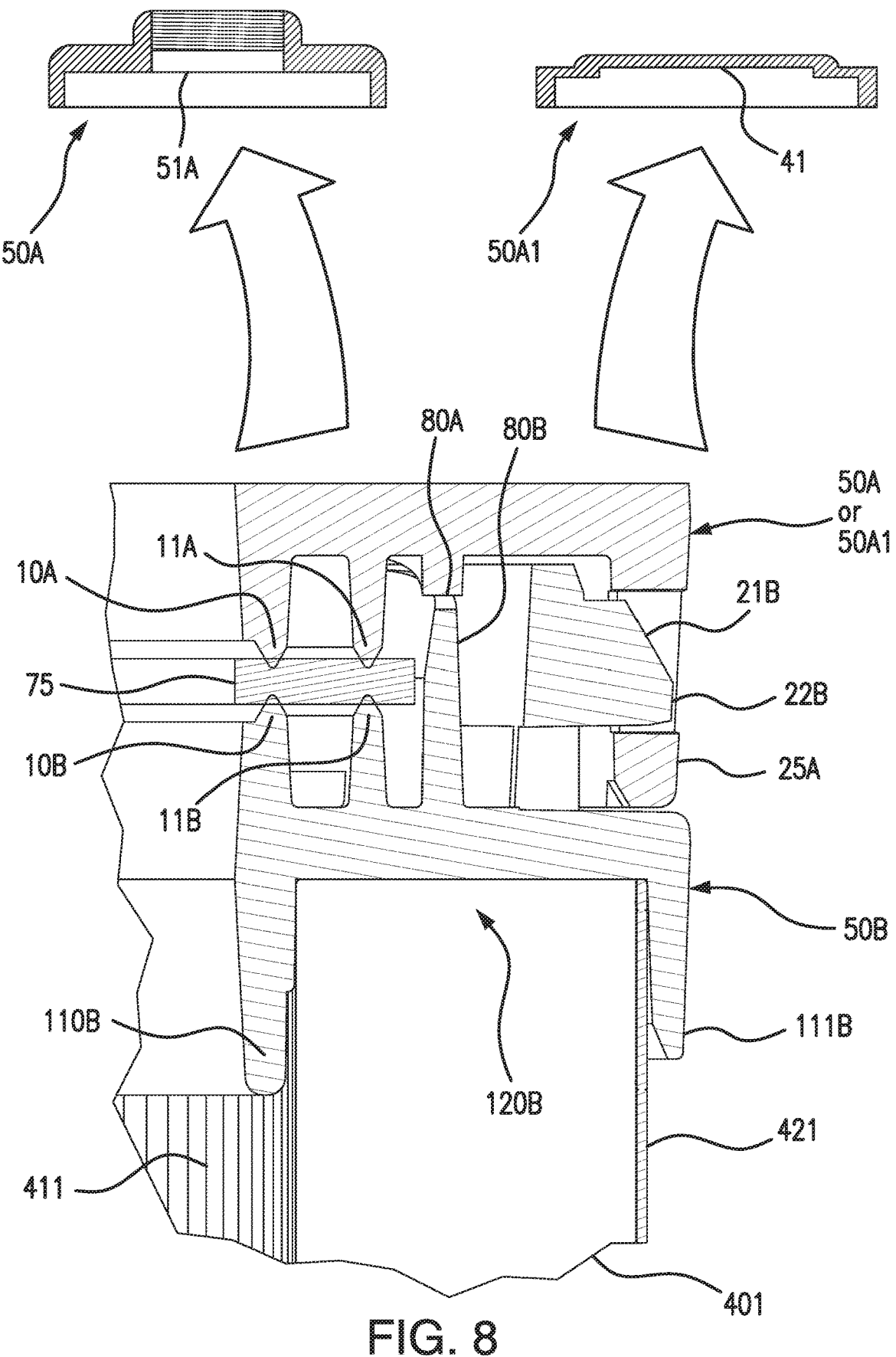
FIG. 8 is a fragmented cross-sectional view taken along line AT-AT of FIG. 7.
Figure 9:
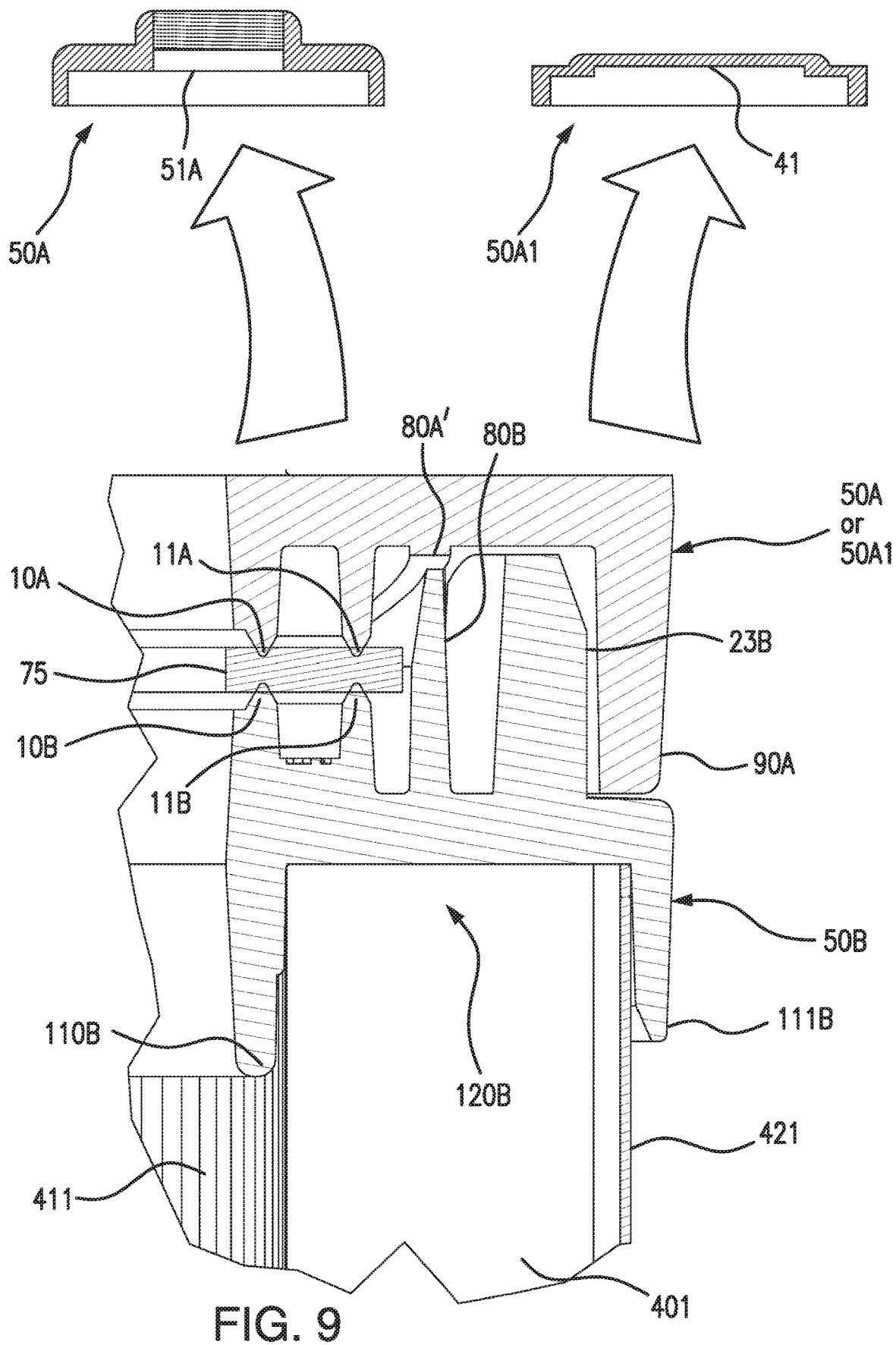
FIG. 9 is a fragmented cross-sectional view taken along line AU-AU of FIG. 7.
Figure 10:
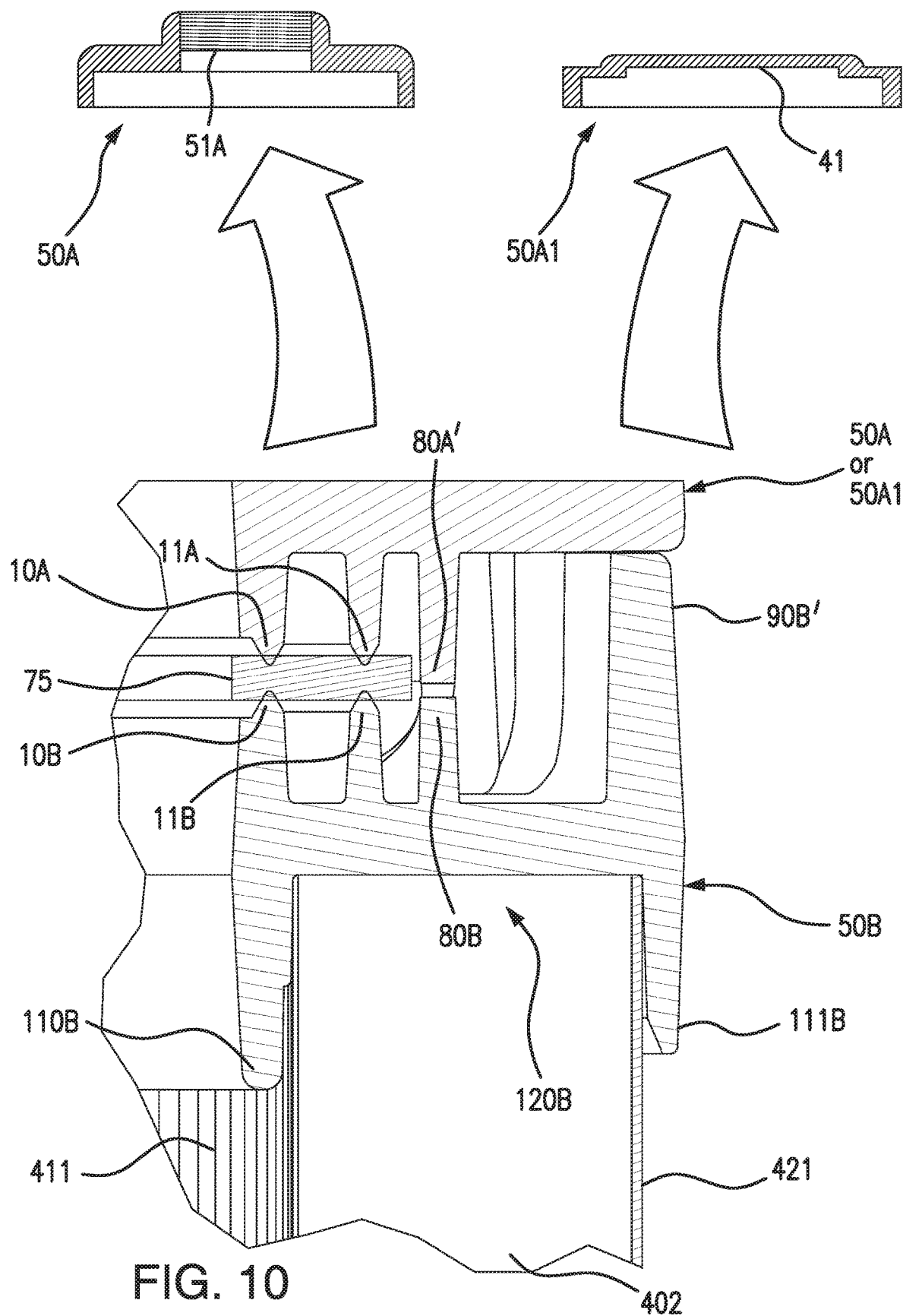
FIG. 10 is a fragmented cross-sectional view taken along line AV-AV of FIG. 7.

As shown in FIGS. 8-10, each second connector element includes an annular channel (typically, generally U-shaped channel) 120B formed by concentrically arranged circular inner walls 110B and outer walls 111B, defining a space for receiving an end of the filter elements. While the filter elements are illustrated with an outer cage 421 contacting the outer wall 111B, the cages are optional. The ends of the filter elements in the channels are preferably bound therein, e.g., by adhesive or other bonding reagents and/or techniques known in the art.

In some embodiments of the filter, one of the first or second ends of the hollow cylindrical filter element is received in the annular channel 120B of the second connector element, and the other of the first or second ends of the hollow cylindrical filter element is received in an annular channel of an additional second connector element which is lockably engageable with an additional first connector element, or, one of the first or second ends of the hollow cylindrical filter element is received in the annular channel 120B of the second connector element, and the other of the first or second ends of the hollow cylindrical filter element is connected to a conventional end cap.

Figure 5:
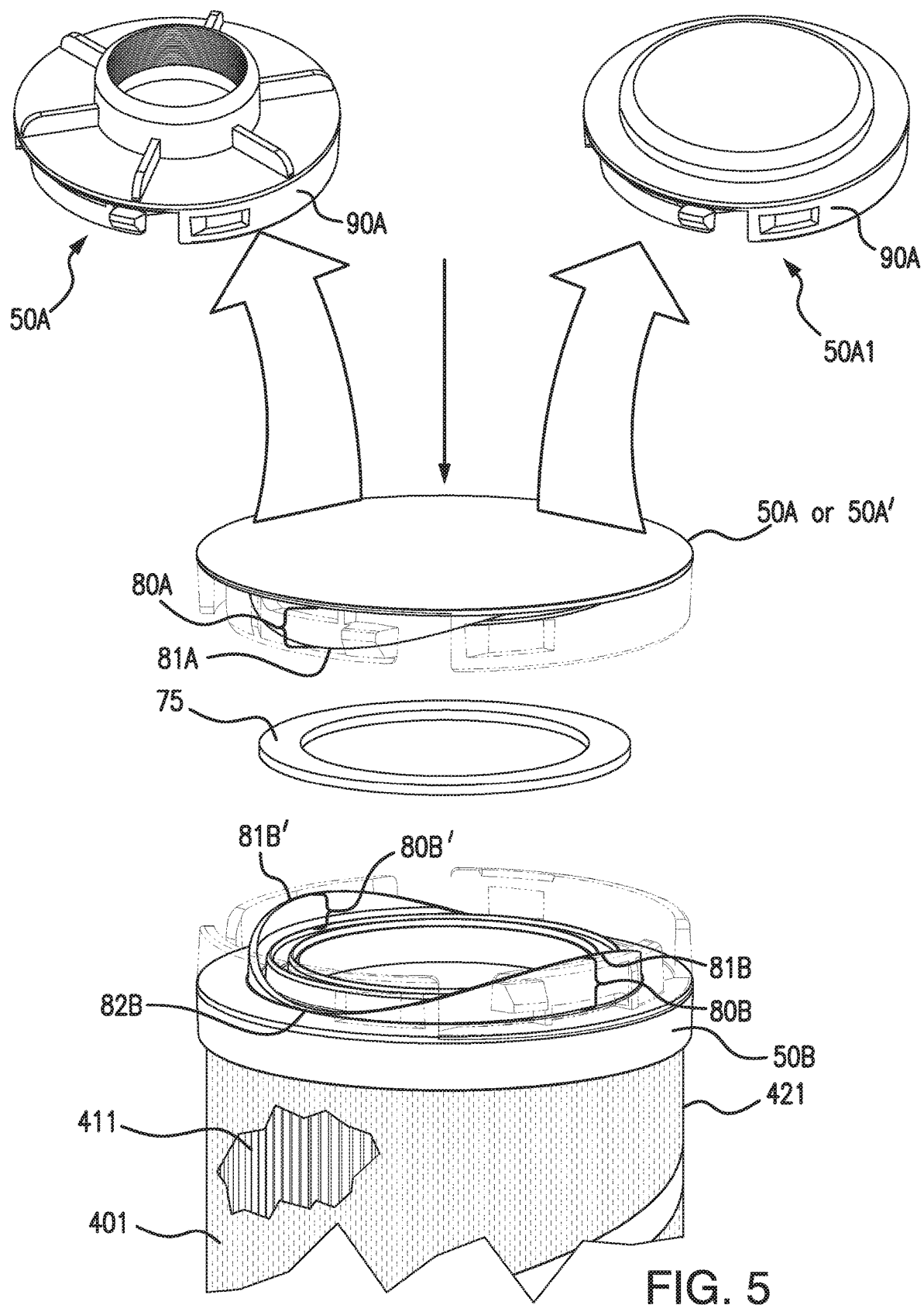

A variety of filter elements can be used in accordance with the invention, and are known in the art. In accordance with embodiments of the invention, the filter elements can have a hollow cylindrical configuration, in some embodiments, a pleated hollow cylindrical configuration. FIGS. 4A and 5 show a pleated hollow cylindrical filter element 401 including pleats 411.

A filter can include additional elements, layers, or components, that can have different structures and/or functions, e.g., at least one of any one or more of the following: prefiltration, support, drainage, spacing and cushioning. Illustratively, the filter can also include at least one additional element such as a mesh and/or a screen. FIGS. 4A, 5, and 8-10 show filter elements with an outer screen 421.

At least one filter is typically disposed in a filter housing comprising at least one inlet and at least one outlet and defining at least one fluid flow path between the inlet and the outlet, wherein the filter assembly is across the fluid flow path, to provide a filter device. Preferably, the filter device is sterilizable. Any housing of suitable shape and providing at least one inlet and at least one outlet may be employed.

The connector elements can be fabricated from any suitable impervious material, e.g., a resilient plastic material that can temporarily deform and spring back to their original configuration, which is compatible with the fluid being processed.

The gasket is typically a pliant elastomeric material.

The filter device housing can be fabricated from any suitable rigid impervious material, including any impervious thermoplastic material, which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An end cap assembly comprising:
   (a) a first connector element comprising at least two first connector element snap arches, each of the at least two first connector element snap arches including a snap tooth lock; and at least two first connector element snap arms, each of the at least two first connector element snap arms including a snap tooth including a snap ramp; the first connector element having a central cavity closed off with a wall, wherein the first connector element also has two walls, each of the two walls having a hyperbolic paraboloid shape;
   (b) a second connector element comprising at least two second connector element snap arches, each of the at least two second connector element snap arches including a snap tooth lock; and at least two second connector element snap arms, each of the at least two second connector element snap arms including a snap tooth including a snap ramp; the second connector element having a central opening, and an annular channel for receiving an end of a hollow cylindrical filter element, wherein the second connector element also has two walls, each of the two walls having a hyperbolic paraboloid shape; and,
   (c) a gasket arranged between the first connector element and the second connector element, the gasket having a central opening;
      wherein the first connector element and the second connector element are lockably engageable with each other when placed in contact with each other and an axial force is applied such that each first connector element snap tooth is retained in each respective second connector element snap tooth lock, and each second connector element snap tooth is retained in each respective first connector element snap tooth lock.

2. An end cap assembly comprising:
   (a) a first connector element comprising at least two first connector element snap arches, each of the at least two first connector element snap arches including a snap tooth lock; and at least two first connector element snap arms, each of the at least two first connector element snap arms including a snap tooth; the first connector element having a central opening with side walls having an internal thread, wherein the first connector element also has two walls, each of the two walls having a hyperbolic paraboloid shape;
   (b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening and an annular channel for receiving an end of a hollow cylindrical filter element, wherein the second connector element also has two walls, each of the two walls having a hyperbolic paraboloid shape; and,
   (c) a gasket arranged between the first connector element and the second connector element, the gasket having a central opening;
      wherein the first connector element and the second connector element are lockably engageable with each other when placed in contact with each other and an axial force is applied such that each first connector element snap tooth is retained in each respective second connector element snap tooth lock, and each second connector element snap tooth is retained in each respective first connector element snap tooth lock.

3. The endcap assembly of claim 1, wherein each first connector element snap tooth and each second connector element snap tooth includes a snap ramp.

4. A filter comprising:
   (a) a first connector element comprising at least two first connector element snap arches, each of the at least two first connector element snap arches including a snap tooth lock; and at least two first connector element snap arms, each of the at least two first connector element snap arms including a snap tooth; the first connector element having a central cavity closed off with a wall, wherein the first connector element also has two walls, each of the two walls having a hyperbolic paraboloid shape;
   (b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening, and an annular channel receiving an end of a hollow cylindrical filter element, wherein the second connector element also has two walls, each of the two walls having a hyperbolic paraboloid shape;
   (c) the hollow cylindrical filter element, having a first end and a second end; and,
   (d) a gasket arranged between the first connector element and the second connector element, the gasket having a central opening; wherein the first connector element and the second connector element are lockably engageable with each other when placed in contact with each other and an axial force is applied such that each first connector element snap tooth is retained in each respective second connector element snap tooth lock, and each second connector element snap tooth is retained in each respective first connector element snap tooth lock.

5. A filter comprising:
(a) a first connector element comprising at least two first connector element snap arches, each of the at least two first connector element snap arches including a snap tooth lock; and at least two first connector element snap arms, each of the at least two first connector element snap arms including a snap tooth; the first connector element having a central opening with side walls having an internal thread, wherein the first connector element also has two walls, each of the two walls having a hyperbolic paraboloid shape;
(b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening, and an annular channel receiving an end of a hollow cylindrical filter element, wherein the second connector element also has two walls, each of the two walls having a hyperbolic paraboloid shape;
(c) the hollow cylindrical filter element, having a first end and a second end; and,
(d) a gasket arranged between the first connector element and the second connector element, the gasket having a central opening; wherein the first connector element and the second connector element are lockably engageable with each other when placed in contact with each other and an axial force is applied such that each first connector element snap tooth is retained in each respective second connector element snap tooth lock, and each second connector element snap tooth is retained in each respective first connector element snap tooth lock.

6. A method of attaching an end cap to a filter element, the method comprising axially aligning
(a) a first connector element comprising at least two first connector element snap arches, each of the at least two first connector element snap arches including a snap tooth lock; and at least two first connector element snap arms, each of the at least two first connector element snap arms including a snap tooth; the first connector element having a central cavity closed off with a wall, wherein the first connector element also has two walls, each of the two walls having a hyperbolic paraboloid shape; with,
(b) a second connector element comprising at least two second connector element snap arches, each of the at least two second connector snap arches including a snap tooth lock; and at least two second connector element snap arms, each of the at least two second connector element snap arms including a snap tooth; the second connector element having a central opening, and an annular channel having a first or second end of a hollow cylindrical filter element bound therein, wherein the second connector element also has two walls, each of the two walls having a hyperbolic paraboloid shape; wherein
(c) a gasket is arranged between the first connector element and the second connector element, the gasket having a central opening; and,
applying an axial force to the first connector element or the filter element such that each first connector element snap tooth is retained in each respective second connector element snap tooth lock, and each second connector element snap tooth is retained in each respective first connector element snap tooth lock.

7. A method of attaching an end cap to a filter element, the method comprising axially aligning
(a) a first connector element comprising at least two first connector element snap arches, each of the at least two first connector element snap arches including a snap tooth lock; and at least two first connector element snap arms, each of the at least two first connector element snap arms including a snap tooth; the first connector element having a central opening with side walls having an internal thread, wherein the first connector element also has two walls, each of the two walls having a hyperbolic paraboloid shape; with,
(b) a second connector element comprising at least two second connector element snap arches, each of the at least two second connector element snap arches including a snap tooth lock; and at least two second connector element snap arms, each of the at least two second connector element snap arms including a snap tooth; the second connector element having a central opening, and an annular channel having a first or second end of a hollow cylindrical filter element bound therein, wherein the second connector element also has two walls, each of the two walls having a hyperbolic paraboloid shape; wherein
(c) a gasket is arranged between the first connector element and the second connector element, the gasket having a central opening; and, applying an axial force to the first connector element or the filter element such that each first connector element snap tooth is retained in each respective second connector element snap tooth lock, and each second connector element snap tooth is retained in each respective first connector element snap tooth lock.

8. The endcap assembly of claim 2, wherein each first connector element snap tooth and each second connector element snap tooth includes a snap ramp.

* * * * *